(12) United States Patent
Fukunaga

(10) Patent No.: US 11,608,071 B2
(45) Date of Patent: Mar. 21, 2023

(54) VEHICLE CONTROL DEVICE

(71) Applicant: SUBARU CORPORATION, Tokyo (JP)

(72) Inventor: Yuta Fukunaga, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 374 days.

(21) Appl. No.: 15/980,729

(22) Filed: May 15, 2018

(65) Prior Publication Data

US 2018/0354527 A1 Dec. 13, 2018

(30) Foreign Application Priority Data

Jun. 9, 2017 (JP) .............................. JP2017-114555

(51) Int. Cl.
*B60W 30/08* (2012.01)
*B60W 50/00* (2006.01)
(Continued)

(52) U.S. Cl.
CPC ........ *B60W 50/0098* (2013.01); *B60W 10/18* (2013.01); *B60W 10/20* (2013.01); *B60W 30/08* (2013.01); *B60W 40/04* (2013.01); *G08G 1/166* (2013.01); *B60W 2554/00* (2020.02); *B60W 2554/80* (2020.02); *B60W 2710/18* (2013.01); *B60W 2710/20* (2013.01)

(58) Field of Classification Search
CPC .. B60W 50/0098; B60W 10/20; B60W 10/18; B60W 40/04; B60W 30/08; B60W 2554/80; B60W 2554/00; B60W 2710/20; B60W 2710/18; B60W 30/16; B60W 2552/00; B60W 2552/05; B60W 30/0956; B60W 30/09; G08G 1/166; G08G 1/16; B60K 31/0008; B60K 31/00
See application file for complete search history.

(56) References Cited

U.S. PATENT DOCUMENTS

2004/0210364 A1* 10/2004 Kudo ..................... G08G 1/166
701/36
2006/0111842 A1* 5/2006 Sugimoto .............. G08G 1/167
340/436
2017/0261602 A1* 9/2017 Olshansky ............ B60W 30/09

FOREIGN PATENT DOCUMENTS

CN 101398982 A * 4/2009 ............. G08G 1/166
CN 106856061 A * 6/2017 ............. G01C 21/34
(Continued)

*Primary Examiner* — Shelley Chen
(74) *Attorney, Agent, or Firm* — McDermott Will & Emery LLP

(57) ABSTRACT

A vehicle control device includes: a three-dimensional object detecting unit, an oncoming vehicle detecting unit, and an erroneous detection determination unit. The three-dimensional object detecting unit detects a three-dimensional object provided between a travel lane in which a host vehicle travels and an opposite lane in which an oncoming vehicle travels. The oncoming vehicle detecting unit detects the oncoming vehicle traveling in the opposite lane. The erroneous detection determination unit determine that the oncoming vehicle detected by the oncoming vehicle detecting unit has been erroneously detected when the oncoming vehicle detected by the oncoming vehicle detecting unit is present within a threshold range from the three-dimensional object detected by the three-dimensional object detecting unit.

1 Claim, 8 Drawing Sheets

(51) Int. Cl.
*B60W 40/04* (2006.01)
*G08G 1/16* (2006.01)
*B60W 10/18* (2012.01)
*B60W 10/20* (2006.01)

(56) References Cited

FOREIGN PATENT DOCUMENTS

| | | | | |
|---|---|---|---|---|
| CN | 104290753 B | * | 11/2017 | .......... B60W 30/165 |
| EP | 2837538 A1 | | 2/2015 | |
| EP | 2921992 A2 | * | 9/2015 | ......... G06K 9/00805 |
| JP | H036418 A | * | 1/1991 | |
| JP | 2008247330 A | * | 10/2008 | |
| JP | 2012106735 A | * | 6/2012 | |
| JP | 2013137710 A | * | 7/2013 | |
| KR | 20140059866 A | * | 5/2014 | |
| WO | WO-2017145634 A1 | * | 8/2017 | ........... G05D 1/0246 |

\* cited by examiner

304

VEHICLE CONTROL DEVICE

CROSS-REFERENCE TO RELATED APPLICATIONS

The present application claims priority from Japanese Patent Application No. 2017-114555 filed on Jun. 9, 2017, the entire contents of which are hereby incorporated by reference.

BACKGROUND

1. Technical Field

The present invention relates to a vehicle control device that makes control to avoid collision between a host vehicle and an oncoming vehicle.

2. Related Art

European Patent Application Publication (EP-A) No. 2837538 discloses a technique that detects a center line separating a travel lane in which a host vehicle travels from an opposite lane in which an oncoming vehicle travels and returns the host vehicle to the travel lane if the host vehicle may collide with the oncoming vehicle when the host vehicle enters the opposite lane for passing.

SUMMARY OF THE INVENTION

An aspect of the present invention provides a vehicle control device including a three-dimensional object detecting unit, an oncoming vehicle detecting unit and an erroneous detection determination unit. The three-dimensional object detecting unit is configured to detect a three-dimensional object provided between a travel lane in which a host vehicle travels and an opposite lane in which an oncoming vehicle travels. The oncoming vehicle detecting unit is configured to detect the oncoming vehicle traveling in the opposite lane. The erroneous detection determination unit is configured to determine that the oncoming vehicle detected by the oncoming vehicle detecting unit has been erroneously detected when the oncoming vehicle detected by the oncoming vehicle detecting unit is present within a threshold range from the three-dimensional object detected by the three-dimensional object detecting unit.

An aspect of the present invention provides a vehicle control device including circuitry. The circuitry is configured to detect a three-dimensional object provided between a travel lane in which a host vehicle travels and an opposite lane in which an oncoming vehicle travels. The circuitry is configured to detect the oncoming vehicle traveling in the opposite lane. The circuitry is configured to determine that the detected oncoming vehicle by the oncoming vehicle detecting unit has been erroneously detected when the detected oncoming vehicle detected is present within a threshold range from the detected three-dimensional object detected.

DETAILED DESCRIPTION

Figure 1:
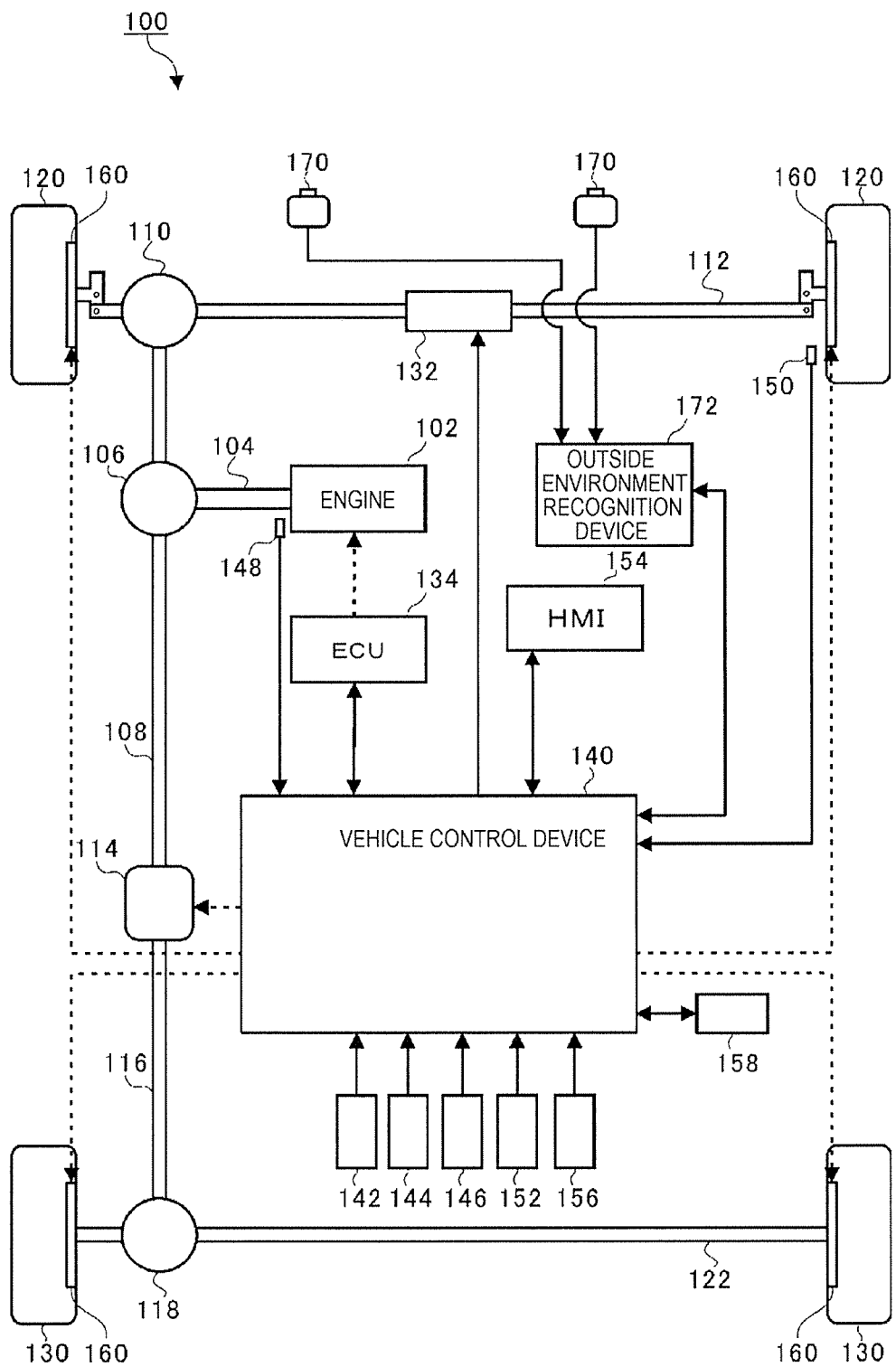
FIG. 1 illustrates the structure of a vehicle.

A preferred example of the present invention will be described with reference to the attached drawings. Dimensions, materials, specific values, and the like indicated in the example are only instances for facilitating understanding of the present invention and do not limit the present invention unless otherwise specified. Further, elements in the example which are not recited in a most-generic independent claim of the disclosure are optional and may be provided on an as-needed basis. The drawings are schematic and are not intended to be drawn to scale. In the specification and drawings, elements having substantially the same function and configuration are denoted by the same reference numeral to omit redundant explanations and elements not directly related to the present invention are not illustrated.

In the related art disclosed in EP-A No. 2837538, if, for instance, an oncoming vehicle is erroneously detected, control is made so that the host vehicle is returned to the travel lane to avoid the erroneously detected oncoming vehicle even when the host vehicle can perform passing otherwise. Since collision between the host vehicle and an oncoming vehicle is erroneously avoided if the oncoming vehicle is erroneously detected in the related art disclosed in EP-A No. 2837538, collision between the host vehicle and the oncoming vehicle cannot be avoided accurately.

It is desirable to provide a vehicle control device capable of accurately avoiding collision between the host vehicle and the oncoming vehicle.

In recent years, a vehicle with a so-called collision avoidance function has come into widespread use in which an onboard camera mounted in the vehicle images the road environment in front of the host vehicle, identifies other vehicles based on color information and position information in the image, and avoids collision with the identified other vehicles or keeps a safe inter-vehicle distance from other vehicles (ACC: Adaptive Cruise Control). The following details a vehicle having an outside environment recognition device that recognizes such an outside environment and a vehicle control device that makes control for avoiding collision between a vehicle (host vehicle) and other vehicles (oncoming vehicles). Note that the example describes a case of a traffic system whereby vehicles move on the left side of a road.

FIG. 1 illustrates the structure of a vehicle (host vehicle) 100. In FIG. 1, the solid arrows indicate the directions of transmission of data and the dashed arrows indicate the directions of transmission of control signals. As illustrated in FIG. 1, the vehicle 100 is an automobile having an engine 102. Although the drive source is an engine here, the drive source may be a motor generator, or an engine and a motor generator.

A crankshaft 104 of the engine 102 is coupled to a front wheel side propeller shaft 108 via a transmission 106. The front wheel side propeller shaft 108 has one end to which a front wheel side drive shaft 112 is coupled via a front differential gear 110 and the other end to which a rear wheel side propeller shaft 116 is coupled via an electronic control coupling 114. Front wheels 120 are coupled to both ends of the front wheel side drive shaft 112.

A rear wheel side drive shaft 122 is coupled to the rear end of the rear wheel side propeller shaft 116 opposite to the electronic control coupling 114 via a rear differential gear 118. Rear wheels 130 are coupled to both ends of the rear wheel side drive shaft 122.

Accordingly, in the vehicle 100, a torque output from the engine 102 is transmitted to the front wheels 120 via the crankshaft 104, the transmission 106, the front wheel side propeller shaft 108, the front differential gear 110, and the front wheel side drive shaft 112.

In addition, in the vehicle 100, a torque output from the engine 102 is transmitted to the rear wheels 130 via the crankshaft 104, the transmission 106, the front wheel side propeller shaft 108, the electronic control coupling 114, the rear wheel side propeller shaft 116, the rear differential gear 118, and the rear wheel side drive shaft 122. The electronic control coupling 114 is capable of adjusting the ratio between the torque (driving force) transmitted to the front wheels 120 and the torque (driving force) transmitted to the rear wheels 130 according to the travel state and an instruction from the driver.

A steering mechanism 132 changes the angle of the front wheels 120 with respect to the vehicle body according to the steering angle of a steering wheel operated by the driver. In addition, the steering mechanism 132 has a steering motor (not illustrated) and changes the angle of the front wheels 120 with respect to the vehicle body by being driven by the steering motor according to control by a steering control unit 212 described later when control is made to avoid collision between the vehicle 100 and an oncoming vehicle.

In addition, the vehicle 100 is provided with an ECU 134. The ECU 134 is configured by a semiconductor integrated circuit including a central processing unit (CPU), a ROM in which a program and the like are stored, a RAM as a work area, and the like and makes centralized control of the engine 102.

In addition, the vehicle 100 is provided with a vehicle control device 140. The vehicle control device 140 is configured by a semiconductor integrated circuit including a central processing unit (CPU), a ROM in which a program and the like are stored, a RAM as a work area, and the like and makes centralized control of individual units of the vehicle 100. The vehicle control device 140 is coupled to an accelerator pedal sensor 142, a brake pedal sensor 144, a vehicle speed sensor 146, a rotation speed sensor 148, an angular velocity sensor 150, and a steering angle sensor 152 and receives signals indicating the values detected by these sensors at predetermined intervals. In addition, the vehicle control device 140 is coupled to a HMI (Human Machine Interface) 154, a GNSS (Global Navigation Satellite System) 156, an inter-vehicle communication device 158, and an outside environment recognition device 172, which will be described later, receives signals (information) transmitted from these devices, and transmits signals (information) to these devices.

The accelerator pedal sensor 142 detects the amount of accelerator pedal depression (amount of accelerator depression) and transmits an accelerator depression amount signal indicating the amount of accelerator depression to the vehicle control device 140. The brake pedal sensor 144 detects the amount of brake pedal depression (amount of brake depression) and transmits a brake depression amount signal indicating the amount of brake depression to the vehicle control device 140. The vehicle speed sensor 146 detects the vehicle speed of the vehicle 100 and transmits a vehicle speed signal indicating the vehicle speed to the vehicle control device 140. The rotation speed sensor 148 detects the rotation speed of the engine 102 and transmits a rotation speed signal indicating the rotation speed to the vehicle control device 140. The angular velocity sensor 150 detects the angular velocity of the front wheels 120 and transmits an angular velocity signal indicating the angular velocity to the vehicle control device 140. The steering angle sensor 152 detects the steering angle of the steering wheel and transmits a steering angle signal indicating the steering angle of the steering wheel to the vehicle control device 140.

The ECU 134 is coupled to the engine 102 and transmits a control signal to the engine 102. In addition, the vehicle control device 140 is coupled to a brake 160 and the electronic control coupling 114 and transmits control signals to the brake 160 and the electronic control coupling 114.

The ECU 134 receives, from the vehicle control device 140, the accelerator depression amount signal transmitted from the accelerator pedal sensor 142 and the rotation speed signal indicating the rotation speed of the engine 102 transmitted from the rotation speed sensor 148. The ECU 134 derives the target torque and the target rotation speed of the engine 102 with reference to a map stored in advance, based on the accelerator depression amount signal and the rotation speed signal. Then, the ECU 134 drives the engine 102 so that the derived target torque and the derived target rotation speed are achieved.

The HMI 154 is an interface between the driver and the vehicle equipment and is a device that reports danger to the driver of the vehicle 100 when, for instance, the vehicle 100 may collide with an oncoming vehicle. A monitor, a speaker, or the like may be used as the HMI 154. For instance, when receiving a danger notification signal (information) from the vehicle control device 140, the HMI 154 reports the danger to the driver of the vehicle 100 by displaying the content of the danger notification in a monitor and giving an alarm sound or a message concerning the risk report via a speaker. In addition, an operating unit is provided by which the driver can set the traffic division (right hand or left hand) in which the vehicle 100 travels, as described later.

The GNSS 156 is a device that detects the position information of the vehicle 100. This GNSS 156 detects the information of the latitude and longitude of the vehicle 100 as the position information of the vehicle 100 via a GNSS antenna (not illustrated). In addition, the GNSS 156 can detect information about the travel direction of the vehicle 100 based on the information of the latitude and longitude of the vehicle 100.

The inter-vehicle communication device 158 is a device that exchanges information with oncoming vehicles on the periphery of the vehicle 100. The inter-vehicle communication device 158 exchanges information with oncoming vehicles on the periphery of the vehicle 100 by transmitting information about the vehicle 100 to oncoming vehicles via communication and receiving (detecting) information about oncoming vehicles via communication. In the present example, the inter-vehicle communication device 158 transmits the information of the position, speed, and travel direction of the vehicle 100 as the information about the vehicle 100 and receives the information of the positions, speeds, and travel directions of oncoming vehicles as the information about the oncoming vehicles.

In addition, the vehicle 100 is provided with imaging apparatuses 170 and the outside environment recognition device 172. Each of the imaging apparatuses 170 includes imaging devices such as CCDs (Charge-Coupled Device) and CMOSs (Complementary Metal-Oxide Semiconductor) and is capable of generating a color image or a monochrome image by taking an image of the environment corresponding to the front of the vehicle 100. Color values are a set of values including one brightness value (Y) and two color difference values (UV) or including three hues (R (red), G (green), B (blue)). Color images and monochrome images taken by the imaging apparatus 170 are referred to as brightness images here to distinguish them from distance images, which will be described later.

In addition, the imaging apparatuses 170 are disposed separately from each other substantially in the horizontal direction on the front side in the travel direction of the vehicle 100 so that the optical axes of the two imaging apparatuses 170 are substantially parallel to each other. The imaging apparatus 170 continuously generates image data obtained by imaging particular objects present in the detection area in front of the vehicle 100 for each of, for instance, 1/60 second frames (60 fps).

The outside environment recognition device 172 obtains image data from the two imaging apparatuses 170, derives the parallax by using so-called pattern matching, and generates a distance image by associating the derived parallax information (equivalent to the relative distance described later) with the image data. A brightness image and a distance image will be described in detail later. In addition, the outside environment recognition device 172 identifies the particular object to which the target object displayed in the detection area in front of the vehicle 100 corresponds by using the brightness value (color value) based on a brightness image and the relative distance information relative to the vehicle 100 based on a distance image. The particular objects to be recognized include not only an object that independently exists, such as a vehicle, a person (pedestrian), a traffic light, a road (traveling path), a lane line of a road, or a guardrail, but also an object identifiable as a part of an object that independently exists, such as a tail lamp, a turn signal, or a lamp of a traffic light. Individual functional units in the following example perform individual processes for each frame when such image data is updated.

The structure of the outside environment recognition device 172 will be described in detail below. The following details the procedure for identifying particular objects such as oncoming vehicles and lane lines positioned in front (in the travel direction) of the host vehicle characteristic of the present example and components not characteristic of the present example are not described.

Figure 2:
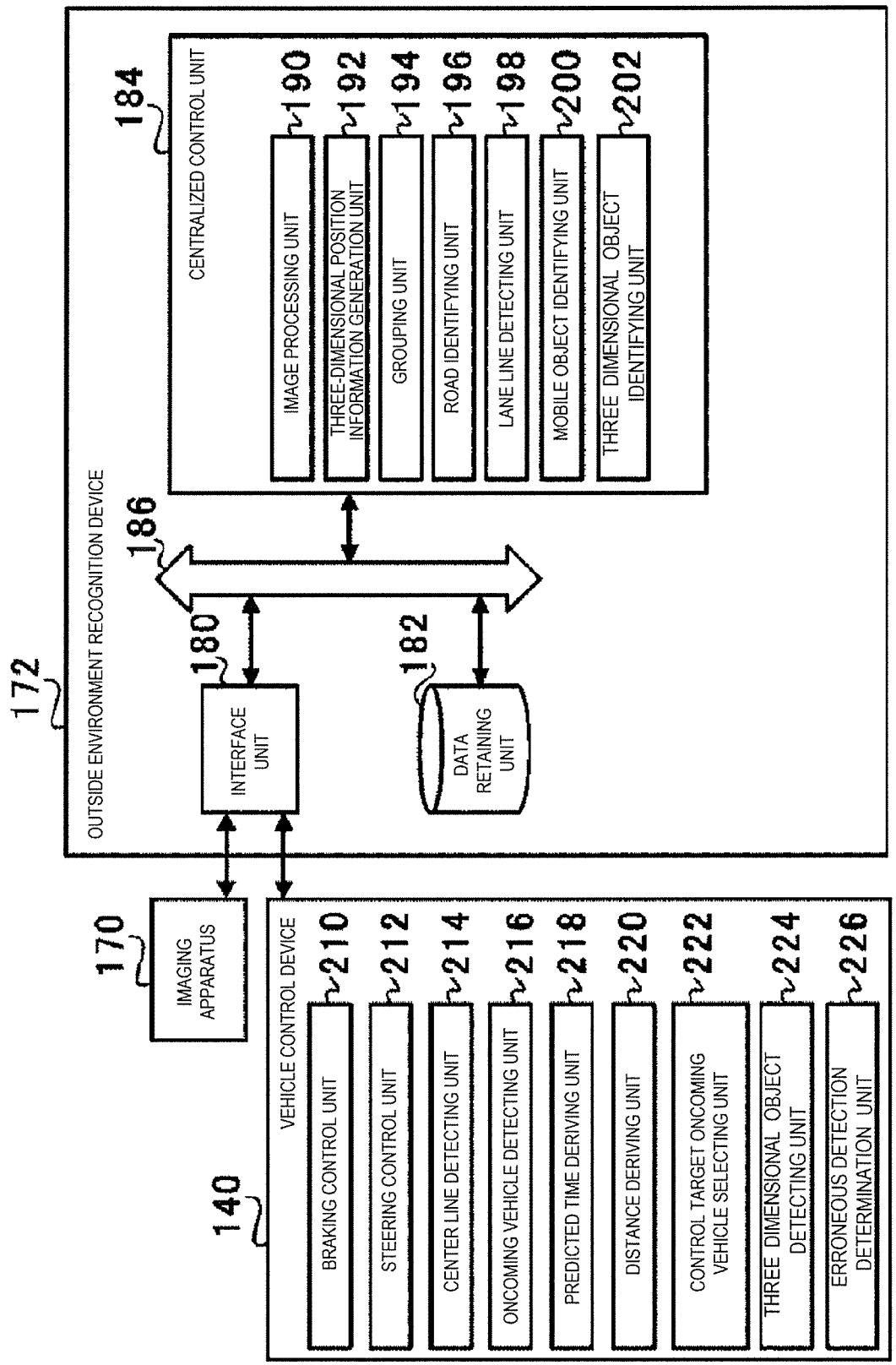
FIG. 2 is a functional block diagram schematically illustrating the functions of a vehicle control device and an outside environment recognition device.

FIG. 2 is a functional block diagram schematically illustrating the functions of the vehicle control device 140 and the outside environment recognition device 172. As illustrated in FIG. 2, the outside environment recognition device 172 includes an interface unit 180, a data retaining unit 182, and a centralized control unit 184.

The interface unit 180 is an interface through which information is exchanged bidirectionally with the imaging apparatus 170 and the vehicle control device 140. The data retaining unit 182 includes a RAM, a flash memory, a HDD, and the like, retains various kinds of information required for processing by the functional units described below, and temporarily retains image data received from the imaging apparatus 170.

The centralized control unit 184 is configured by a semiconductor integrated circuit including a central processing unit (CPU), a ROM in which a program and the like are stored, a RAM as a work area, and the like and controls the interface unit 180, the data retaining unit 182, and the like via a system bus 186. In addition, in the present example, the centralized control unit 184 also functions as an image processing unit 190, a three-dimensional position information generation unit 192, a grouping unit 194, a road identifying unit 196, a lane line detecting unit 198, a mobile object identifying unit 200, and a three-dimensional object identifying unit 202. The processing by these functional units will be described below.

The image processing unit 190 obtains image data from the two imaging apparatuses 170 and derives the parallax using so-called pattern matching in which the block corresponding to a block (for instance, an array having four horizontal pixels and four vertical pixels) extracted arbitrarily from one image data is searched for in the other image data. Here, "horizontal" represents the screen horizontal direction (direction along the longer side) of a taken brightness image and "vertical" represents the screen vertical direction (direction along the shorter side) of the taken brightness image.

This pattern matching is considered to compare the brightness values (Y-color difference signals) for each block indicating any image position between two pieces of image data. For instance, there are methods such as SAD (Sum of Absolute Difference) that takes the difference between brightness values, SSD (Sum of Squared intensity Difference) that uses the square of the difference, and NCC (Normalized Cross Correlation) that takes the similarity of variance values obtained by subtracting the average value from the brightness values of individual pixels. The image processing unit 190 performs such parallax deriving processing for each block on all blocks displayed in the detection area (having, for instance, 600 horizontal pixels and 180 vertical pixels). Although a block has four horizontal pixels and four vertical pixels here, a block may have any number of pixels.

However, although the image processing unit 190 can derive the parallax for each block that is the detection resolution unit, the image processing unit 190 cannot recognize the target object to which the block belongs. Accordingly, parallax information is derived independently for each detection resolution unit (referred to below as a three-dimensional part) such as, for instance, a block in the detection area, not for each target object. The image in which the parallax information (equivalent to the relative distance information) derived in this way is associated with the three-dimensional parts of image data is referred to as a distance image.

Figure 3A:
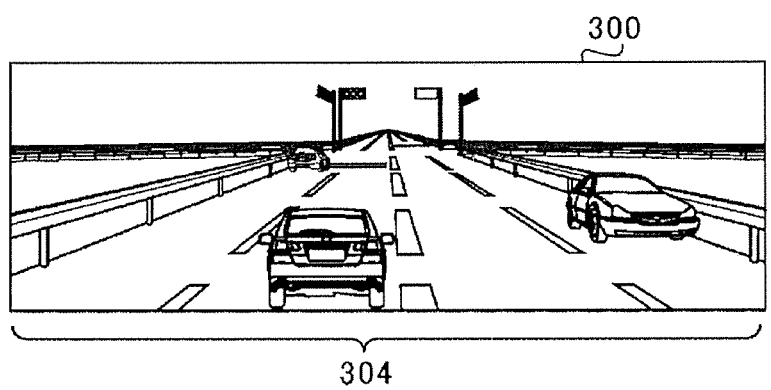
FIG. 3A and FIG. 3B are explanatory diagrams used to describe a brightness image and a distance image.
Figure 3B:
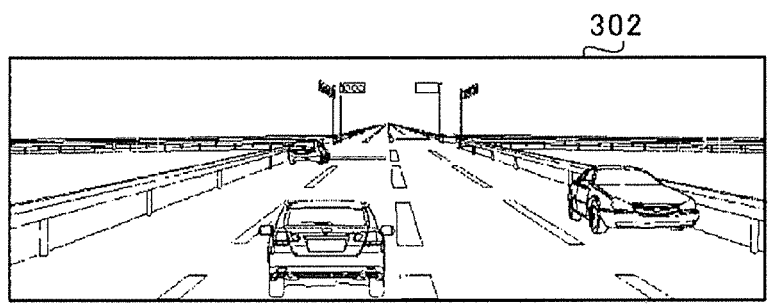

FIG. 3A and FIG. 3B are explanatory diagrams used to describe a brightness image 300 and a distance image 302. It is assumed that, for instance, the brightness image (image data) 300 as illustrated in FIG. 3A is generated through the two imaging apparatuses 170 for a detection area 304. However, only one of the two brightness image 300 is schematically illustrated here for ease of understanding. In the present example, the image processing unit 190 obtains the parallax for each of three-dimensional parts from the brightness image 300 and forms the distance image 302 as illustrated in FIG. 3B. Each of three-dimensional parts in the distance image 302 is associated with the parallax of the three-dimensional part. For convenience of description, the three-dimensional parts for which parallaxes have been derived are indicated by black dots here.

Returning to FIG. 2, the three-dimensional position information generation unit 192 converts the parallax information for each of three-dimensional parts in the detection area 304 to three-dimensional position information including the horizontal distance, the height, and the relative distance using the so-called stereo method based on the distance image 302 generated by the image processing unit 190. The stereo method derives the relative distance of a three-dimensional part with respect to the imaging apparatus 170 based on the parallax of a three-dimensional part using a triangular surveying method. At this time, the three-dimensional position information generation unit 192 derives the height of a three-dimensional part from the road surface based on the relative distance of the three-dimensional part and the distance on the distance image 302 from the point on the road surface distant by the same relative distance as in the three-dimensional part to the three-dimensional part.

The grouping unit 194 assumes that the three-dimensional parts for which the differences of three-dimensional positions (horizontal distances x, heights y, and relative distances z) are present within a predetermined range (for instance 0.1 m) in the distance image 302 correspond to the same particular object and groups these three-dimensional parts. In this way, a target object that is a set of three-dimensional parts is generated. The range of grouping described above is represented by a distance in a real space and can be set to any value by the manufacturer. In addition, for three-dimensional parts newly added by grouping, the grouping unit 194 further groups the three-dimensional parts for which the differences of the horizontal distances x, the differences of heights y, and the differences of relative distances z are present within a predetermined range using the added three-dimensional parts as base points. Consequently, all three-dimensional parts that can be assumed to be the same particular object are grouped into a target object.

When the target object meets a predetermined condition corresponding to a road (for instance, when the positional relationship with lane lines, other vehicles, and road side target objects such as guardrails corresponds to a particular object "road"), the road identifying unit 196 identifies the target object as the particular object "road".

The lane line detecting unit 198 identifies lane lines on the surface of the identified road based on the three-dimensional positions in the distance image 302 and the brightness values (color values) based on the brightness image 300. The target to be identified includes a yellow line. In addition, a dashed lane line and a dashed yellow line are also targets to be identified. In the following description, a lane line also includes a yellow line and a dashed line (dashed lane line and dashed yellow line).

For instance, the lane line detecting unit 198 detects, as a lane line, an object that is grouped on the road surface by the grouping unit 194, has a color within the preset brightness range of a lane line, and stretches toward the front of a travel path on the road surface. Although the lane line detecting unit 198 detects a lane line based on image data from the imaging apparatuses 170 here, the lane line detecting unit 198 may detect a lane line by another way such as, for instance, a laser.

When the target object obtained by grouping meets a predetermined condition corresponding to a vehicle (for instance, the target object is positioned on a road and the entire size of the target object corresponds to the size of the particular object "vehicle"), the mobile object identifying unit 200 identifies the target object as a particular object "another vehicle".

When the target object obtained by grouping meets a predetermined condition corresponding to a wall, the three-dimensional object identifying unit 202 identifies the target object as a particular object "wall". When the difference of three-dimensional positions (horizontal distances x, heights y, and relative distances z) is present within a predetermined range (for instance, 0.1 m), the height y is equal to or more than a predetermined height, and the target object stretches toward the front of a travel path on the road surface, the three-dimensional object identifying unit 202 identifies the target object as a "wall". In the present example, a wall is provided in the center divider of the road, has a height equal to or more than a predetermined height, and stretches toward the front of a travel path on the road surface. Although the three-dimensional object identifying unit 202 identifies a wall provided in the center divider of the road in the present example, the three-dimensional object identifying unit 202 may identify a three-dimensional object such as a tree provided in the center divider of the road.

In addition, the vehicle control device 140 functions as a braking control unit 210, the steering control unit 212, a center line detecting unit 214, an oncoming vehicle detecting unit 216, a predicted time deriving unit 218, a distance deriving unit 220, a control target oncoming vehicle selecting unit 222, a three-dimensional object detecting unit 224, and an erroneous detection determination unit 226.

When receiving the brake depression amount signal from the brake pedal sensor 144, the braking control unit 210 brakes the vehicle 100 by controlling the brake 160 according to the brake depression amount signal.

The steering control unit 212 controls the steering mechanism 132 according to the accelerator depression amount signal, the brake depression amount signal, the vehicle speed signal, a rotation angle signal for the engine 102, the angular velocity signal for the front wheels 120, and the steering angle signal.

The center line detecting unit 214 detects the center line that separates the travel lane in which the vehicle 100 travels from the opposite lane in which oncoming vehicles travel, based on the lane lines on the road detected by the lane line detecting unit 198. For instance, the center line detecting unit 214 detects the lane line closest to the center of the road as the center line based on the road identified by the road identifying unit 196 and the lane lines on the road detected by the lane line detecting unit 198. In addition, the center line detecting unit 214 identifies the side on which the vehicle 100 is positioned as the travel lane based on the center line and identifies the side opposite to the side on which the vehicle 100 is positioned as the opposite lane based on the center line.

The oncoming vehicle detecting unit 216 detects oncoming vehicles that travel in the opposite lane. How to specifically detect oncoming vehicles will be described later.

The predicted time deriving unit 218 derives the collision predicted time that elapses before the vehicle 100 collides with an oncoming vehicle. Specifically, the predicted time deriving unit 218 obtains the position and the travel direction of the vehicle 100 based on the information obtained from the GNSS 156 and obtains the speed of the vehicle 100 based on the information obtained from the vehicle speed sensor 146. In addition, the predicted time deriving unit 218 derives the position, the speed, and the travel direction of the oncoming vehicle based on the obtained information of the vehicle 100 and the information (distance image described above) of the oncoming vehicle detected by the oncoming vehicle detecting unit 216. Then, the predicted time deriving unit 218 derives the collision predicted time that elapses before the oncoming vehicle reaches the vehicle 100 based on the position, the speed, and the travel direction of the oncoming vehicle and the position, the speed, and the travel direction of the vehicle 100. The predicted time deriving unit 218 derives the time that elapses before the oncoming vehicle passes the vehicle 100. For instance, the predicted time deriving unit 218 derives the time that elapses before the oncoming vehicle reaches the line extending orthogonally to the travel direction of the vehicle 100 from the front end in the travel direction.

The distance deriving unit 220 derives a first distance between the vehicle 100 and the oncoming vehicle in the travel direction of the vehicle 100 and a second distance between the vehicle 100 and the oncoming vehicle in the direction orthogonal to the travel direction of the vehicle 100. Specifically, the distance deriving unit 220 obtains the position and the travel direction of the vehicle 100 based on the information obtained from the GNSS 156. In addition, the distance deriving unit 220 derives the position and the travel direction of the oncoming vehicle based on the obtained information of the vehicle 100 and the information (distance image described above) of the oncoming vehicle obtained by the oncoming vehicle detecting unit 216. Then, the distance deriving unit 220 derives the first distance and the second distance described above based on the position and the travel direction of the oncoming vehicle and the position and the travel direction of the vehicle 100.

The control target oncoming vehicle selecting unit 222 selects the control target oncoming vehicle for which collision with the vehicle 100 is avoided. How to specifically select the control target oncoming vehicle will be described later.

The three-dimensional object detecting unit 224 detects a three-dimensional object (wall or tree) provided between the travel lane in which the vehicle 100 travels and the opposite lane in which the oncoming vehicle travels. Specifically, the three-dimensional object detecting unit 224 detects a wall (or tree) close to the opposite lane among the walls (or trees) identified by the three-dimensional object identifying unit 202 based on the information of the traffic division set and input by the driver.

The erroneous detection determination unit 226 determines whether the oncoming vehicle detected by the oncoming vehicle detecting unit 216 has been erroneously detected. How to specifically determine erroneous detection will be specifically described later.

Figure 4:
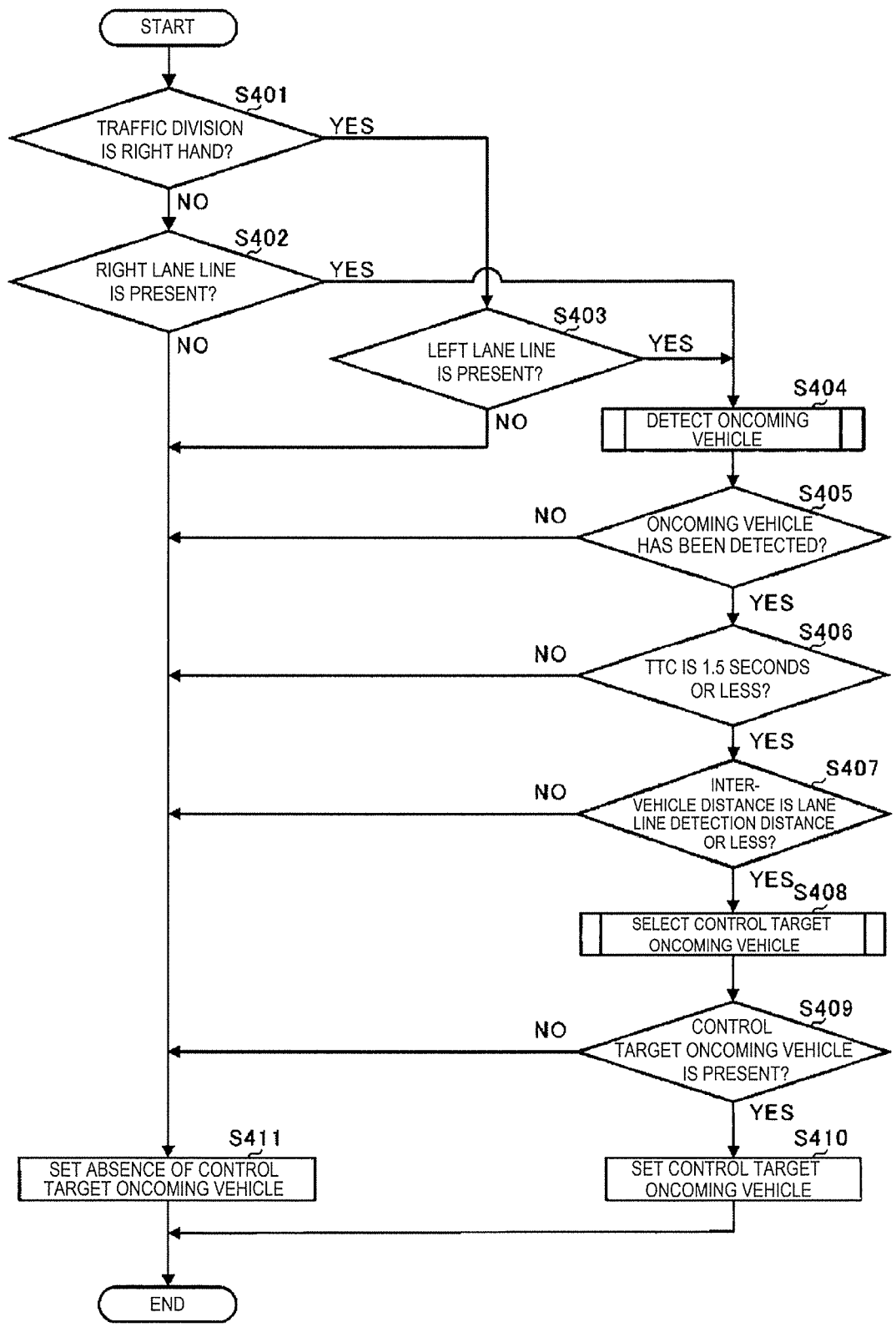
FIG. 4 is a flowchart illustrating control target oncoming vehicle set processing according to the present example.

FIG. 4 is a flowchart illustrating control target oncoming vehicle set processing according to the present example.

The control target oncoming vehicle selecting unit 222 first obtains information about the traffic division from the HMI 154. The HMI 154 is configured so that the driver can perform travel lane customization switching. The driver can input information about a traffic division to the HMI 154 by performing travel lane customization switching in advance.

The control target oncoming vehicle selecting unit 222 determines whether the traffic division is set to the right hand based on the information about the traffic division obtained from the HMI 154 (step S401). When the traffic division is the right hand, the processing proceeds to step S403. When the traffic division is the left hand, the processing proceeds to step S402.

When the traffic division is the left hand (NO in step S401), the control target oncoming vehicle selecting unit 222 determines whether a lane line has been detected on the right side of the vehicle 100 (step S402). When a lane line has been detected on the right side of the vehicle 100, the processing proceeds to step S404. When no lane line is detected on the right side of the vehicle 100, the processing proceeds to step S411.

When the traffic division is the right hand (YES in step S401), the control target oncoming vehicle selecting unit 222 determines whether a lane line has been detected on the left side of the vehicle 100 (step S403). When a lane line has been detected on the left side of the vehicle 100, the processing proceeds to step S404. When no lane line is detected on the left side of the vehicle 100, the processing proceeds to step S411.

When step S402 produces a YES result or step S403 produces a YES result, the control target oncoming vehicle selecting unit 222 causes the oncoming vehicle detecting unit 216 to perform oncoming vehicle detection processing.

Figure 5:
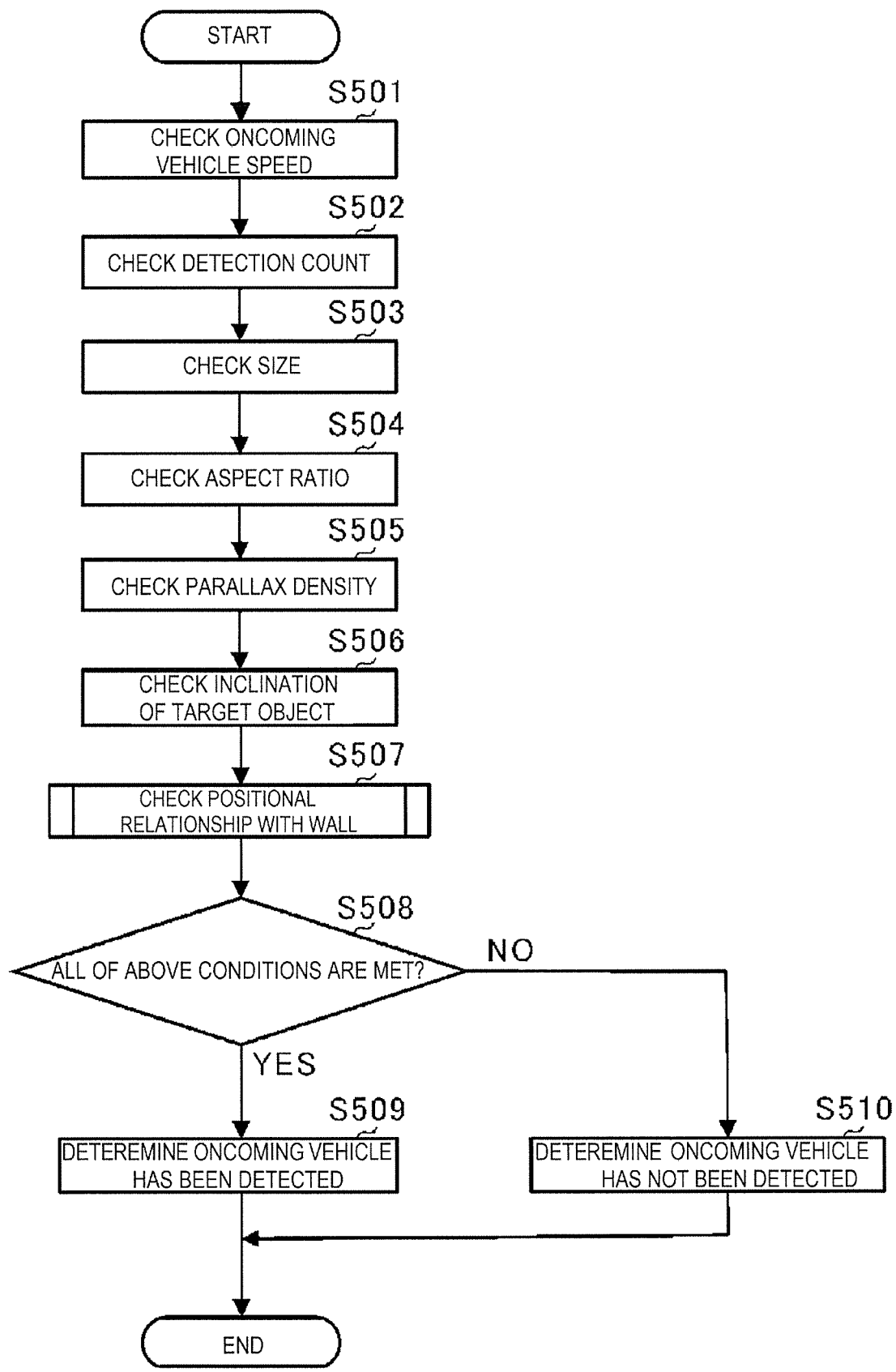
FIG. 5 is a flowchart illustrating oncoming vehicle detection processing according to the present example.

FIG. 5 is a flowchart illustrating oncoming vehicle detection processing according to the present example.

The oncoming vehicle detecting unit 216 first derives the speed of the target object based on the information (distance image described above) of the target object identified by the mobile object identifying unit 200. Then, the oncoming vehicle detecting unit 216 checks whether the speed (oncoming vehicle speed) of the target object is equal to or more than a predetermined speed (for instance, 15 km/h or more) (step S501). When the speed of the target object is less than the predetermined speed, since the target object is considered to travel at a low speed or be stopped, the target object traveling at less than the predetermined speed is determined not to be the oncoming vehicle for which collision with the vehicle 100 is avoided.

Based on the information of the target object identified by the mobile object identifying unit 200, the oncoming vehicle detecting unit 216 checks whether the detection count of the identified target object is equal to or more than a predetermined count (step S502). The predetermined count changes depending on the position (or the distance from the vehicle 100 to the target object) or the speed of the identified target object. When the detection count of the target object is less than the predetermined count, since the target object was likely to be erroneously detected, the target object detected at less than the predetermined count is determined not to be the oncoming vehicle for which collision with the vehicle 100 is avoided.

The oncoming vehicle detecting unit 216 checks whether the size of the target object is equal to or more than a predetermined size based on the information of the target object identified by the mobile object identifying unit 200 (step S503). Specifically, the oncoming vehicle detecting unit 216 checks the vertical length (height), the horizontal length (width), and the area of the target object and checks whether these values are equal to or more than the predetermined size. The predetermined size changes depending on the position (or the distance from the vehicle 100 to the target object) of the target object. In addition, the predetermined size also changes depending on the outside environment (for instance, evening or night) of the vehicle 100. When the size of the target object is less than the predetermined size, since the target object is determined not to have the vehicle size, the target object having less than the predetermined size is determined not to be the oncoming vehicle for which collision with the vehicle 100 is avoided.

The oncoming vehicle detecting unit 216 checks whether the aspect ratio of the target object falls within a predetermined range based on the information of the target object identified by the mobile object identifying unit 200 (step S504). Specifically, the oncoming vehicle detecting unit 216 checks the ratio between the vertical length (height) and the horizontal length (width) of the target object and checks whether this ratio falls within the predetermined range. When the aspect ratio of the target object falls outside the predetermined range, since the target object is likely to be a target object other than a vehicle, the target object falling outside the predetermined range is determined not to be the oncoming vehicle for which collision with the vehicle 100 is avoided.

The oncoming vehicle detecting unit 216 checks whether the parallax density of the target object falls within a predetermined density range based on the information of the target object identified by the mobile object identifying unit 200 (step S505). The parallax density is obtained by dividing the number of distance points by the horizontal width (the screen horizontal direction (direction along the longer side) of the distance image). The predetermined density range is the range of actually measured values obtained by experiment. When the parallax density of the target object falls outside the predetermined density range, since the target object is likely to be a target object other than a vehicle, the target object falling outside the predetermined density range is determined not to be the oncoming vehicle for which collision with the vehicle 100 is avoided.

The oncoming vehicle detecting unit 216 checks whether the inclination of the target object is equal to or less than a predetermined angle (for instance, within 45 degrees) based on the information of the target object identified by the mobile object identifying unit 200 (step S506). The inclination of the target object is the angle formed by the line extending in the travel direction of the vehicle 100 and the line between the vehicle 100 and the target object. When the inclination of the target object is more than the predetermined angle, the target object is determined to be a vehicle that is meeting the opposite lane or going away from the opposite lane while moving orthogonally to the direction in which the opposite lane extends, and the target object having an angle more than the predetermined angle is determined not to be the oncoming vehicle for which collision with the vehicle 100 is avoided.

The erroneous detection determination unit 226 checks the positional relationship between the wall detected by the three-dimensional object detecting unit 224 and the oncoming vehicle (step S507). The processing in step S507 for checking the positional relationship between the wall and the oncoming vehicle will be described below with reference to FIG. 6.

Figure 6:
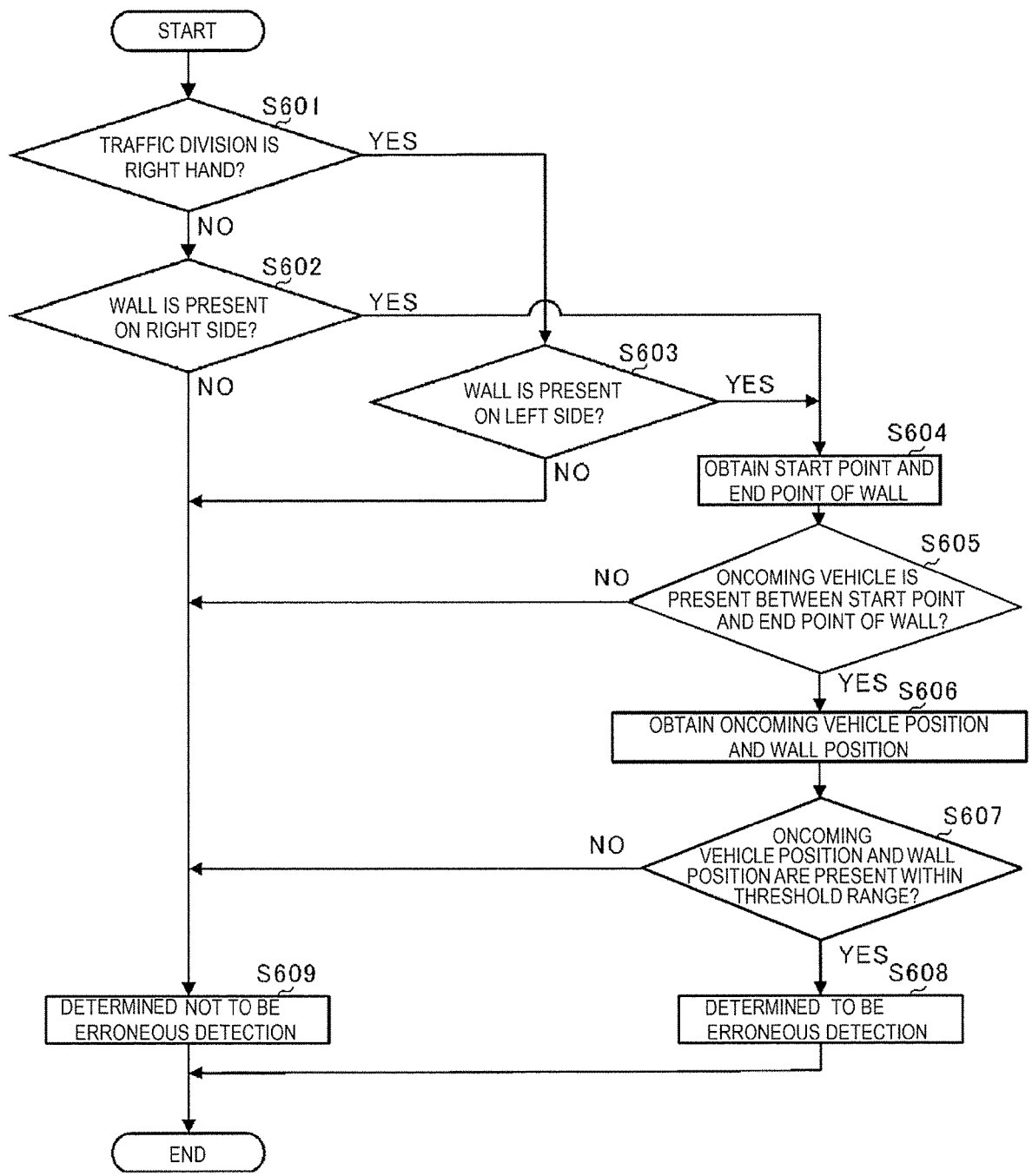
FIG. 6 is a flowchart illustrating positional relationship check processing according to the present example.

FIG. 6 is a flowchart illustrating positional relationship check processing according to the present example.

The three-dimensional object detecting unit 224 first obtains information about the traffic division from the HMI 154 and determines whether the traffic division is set to the right hand (step S601). When the traffic division is the right hand, the processing proceeds to step S603. When the traffic division is the left hand, the processing proceeds to step S602.

When the traffic division is the left hand (NO in step S601), the three-dimensional object detecting unit 224 determines whether a wall has been detected on the right side of the vehicle 100 (step S602). When a wall has been detected on the right side of the vehicle 100, the processing proceeds to step S604. When no wall has been detected on the right side of the vehicle 100, the processing proceeds to step S609.

When the traffic division is the right hand (YES in step S601), the three-dimensional object detecting unit 224 determines whether a wall has been detected on the left side of the vehicle 100 (step S603). When a wall has been detected on the left side of the vehicle 100, the processing proceeds to step S604. When no wall has been detected on the left side of the vehicle 100, the processing proceeds to step S609.

The erroneous detection determination unit 226 divides the wall detected by the three-dimensional object detecting unit 224 by a segment value and obtains the start point and the end point of the wall (step S604). The segment value is obtained based on the maximum distance in the travel direction of the vehicle 100 that can be detected by the outside environment recognition device 172. In the present example, a wall is divided by 4096 mm (segment value) and the start point and the end point of the wall are obtained based on the segment value. The start point and the end point of the wall may be obtained based on the wall information detected in the past. For instance, the wall detected currently may be interpolated by using the wall detected in the past in consideration of the position, the travel direction, and the vehicle speed of the vehicle 100.

The erroneous detection determination unit 226 determines whether the oncoming vehicle is present between the start point and the end point of the segment value of the wall based on the information of the oncoming vehicle identified by the mobile object identifying unit 200 (step S605). When the oncoming vehicle is present between the start point and the end point of the segment value of the wall, the processing proceeds to step S606. When the oncoming vehicle is not present between the start point and the end point of the segment value of the wall, the processing proceeds to step S609.

When the oncoming vehicle is present between the start point and the end point of the segment value of the wall (YES in step S605), the erroneous detection determination unit 226 obtains the longitudinal position (position in the travel direction of the vehicle 100) and the lateral position (position in the direction orthogonal to the travel direction of the vehicle 100) of the oncoming vehicle. In addition, the erroneous detection determination unit 226 obtains the lateral position of the wall in the longitudinal position corresponding to the longitudinal position of the oncoming vehicle (step S606).

The erroneous detection determination unit 226 compares the obtained lateral position of the oncoming vehicle with the obtained lateral position of the wall and determines whether the lateral position of the oncoming vehicle is present within the threshold range from the lateral position of the wall (step S607). The threshold range is, for instance, 500 mm. When the lateral position of the oncoming vehicle is present within the threshold range from the lateral position of the wall, it is determined that part of the wall has been erroneously detected as the oncoming vehicle due to error or the like in the brightness image 300 taken by the imaging apparatuses 170. When the lateral position of the oncoming vehicle is present within the threshold range from the lateral position of the wall, the processing proceeds to step S608. When the lateral position is present outside the threshold range, the processing proceeds to step S609.

When the lateral position of the oncoming vehicle is present within the threshold range from the lateral position of the wall (YES in step S607), the erroneous detection determination unit 226 determines that the detected oncoming vehicle has been erroneously detected (step S608) and ends positional relationship check processing.

When steps S602, S603, S605, and S607 produce NO results, the erroneous detection determination unit 226 determines that the detected oncoming vehicle has not been erroneously detected (step S609) and ends positional relationship check processing.

Returning to FIG. 5, the oncoming vehicle detecting unit 216 determines whether all of the conditions in steps S501 to S507 are met (step S508). When all of the conditions in steps S501 to S507 are met, the processing proceeds to step S509. When any of the conditions in steps S501 to S507 is not met, the processing proceeds to step S510.

When all of the conditions in steps S501 to S507 are met (YES in step S508), the oncoming vehicle detecting unit 216 determines that the oncoming vehicle has been detected (step S509) and finishes the oncoming vehicle detection processing.

When any of the conditions in steps S501 to S507 is not met (NO in step S508), the oncoming vehicle detecting unit 216 determines that the oncoming vehicle has not been detected (undetected) (step S510) and finishes the oncoming vehicle detection processing.

Returning to FIG. 4, the control target oncoming vehicle selecting unit 222 determines whether the oncoming vehicle has been detected (step S405). When the oncoming vehicle has been detected, the processing proceeds to step S406. When the oncoming vehicle has not been detected, the processing proceeds to step S411.

When the oncoming vehicle has been detected (YES in step S405), the control target oncoming vehicle selecting unit 222 obtains a collision predicted time (TTC: Time To Collision), which is the time that elapses before the vehicle 100 collides with the oncoming vehicle, from the predicted time deriving unit 218. Then, a determination is made as to whether the TTC is equal to or less than a predetermined time (for instance, within 1.5 seconds) (step S406) When the TTC is equal to or less than the predetermined time, the processing proceeds to step S407. When the TTC is more than the predetermined time, the processing proceeds to step S411.

When the TTC is equal to or less than the predetermined time (YES in step S406), the control target oncoming vehicle selecting unit 222 determines whether the distance between the vehicle 100 and the oncoming vehicle in the travel direction of the vehicle 100 is equal to or less than a lane line detection distance (step S407). Here, the control target oncoming vehicle selecting unit 222 obtains the length (distance) of the lane line (center line) detected by the lane line detecting unit 198 in the travel direction of the vehicle 100. Then, the length of the lane line detected by the lane line detecting unit 198 is compared with the distance between the vehicle 100 and the oncoming vehicle. When the distance between the vehicle 100 and the oncoming vehicle is longer than the distance within which a lane line is detectable, since the oncoming vehicle is not reliably recognized as an oncoming vehicle, the control target oncoming vehicle selecting unit 222 determines that the oncoming vehicle is not an oncoming vehicle. When the lane line is equal to or shorter than the detectable distance, the processing proceeds to step S408. When the lane line is longer than the detectable distance, the processing proceeds to step S411.

When the distance between the vehicle 100 and the oncoming vehicle is equal to or less than the lane line detection distance (YES in step S407), the control target oncoming vehicle selecting unit 222 performs control target oncoming vehicle selection processing (step S408).

Figure 7:
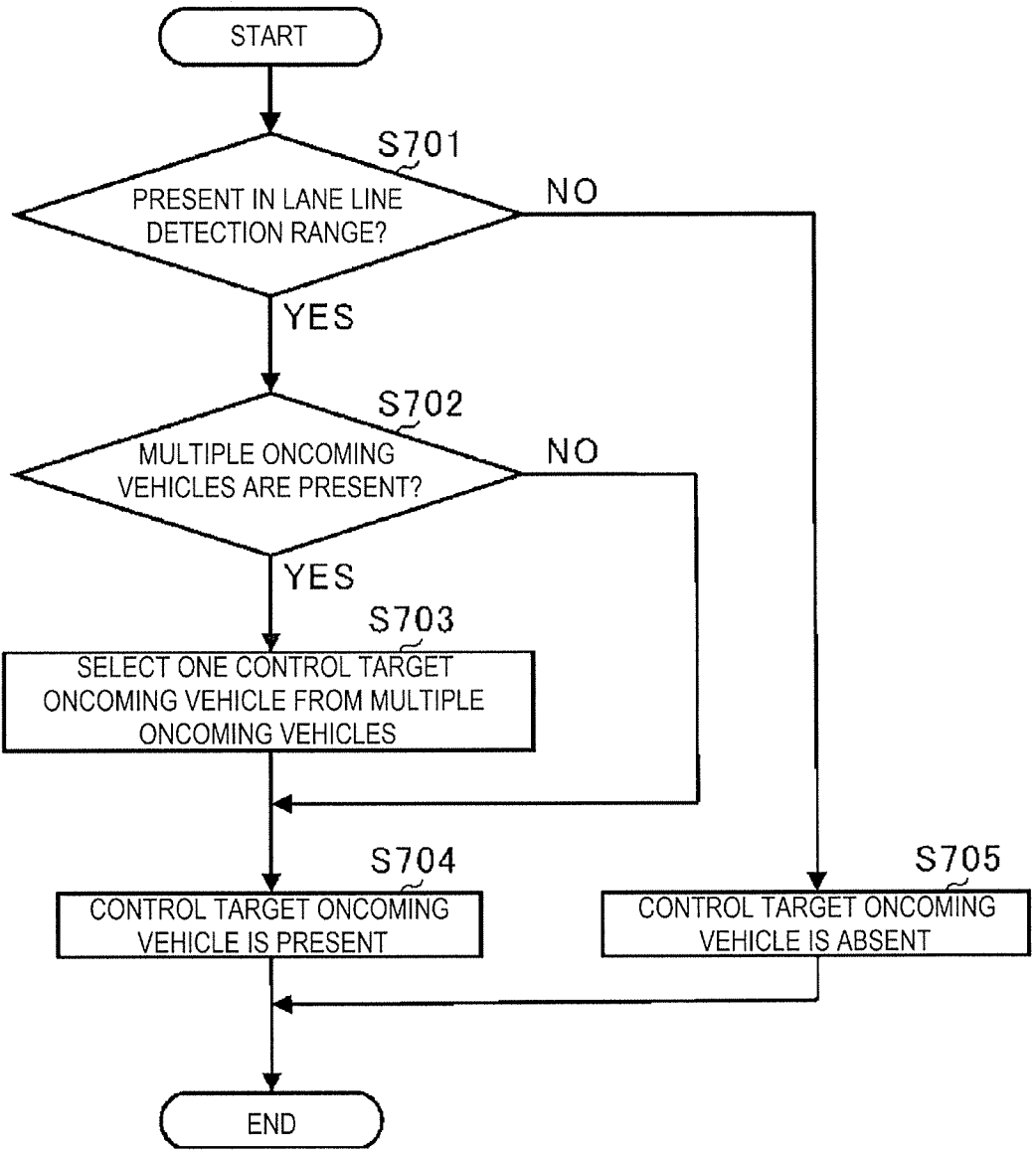
FIG. 7 is a flowchart illustrating control target oncoming vehicle selection processing according to the present example.

FIG. 7 is a flowchart illustrating control target oncoming vehicle selection processing according to the present example.

The control target oncoming vehicle selecting unit 222 determines whether the oncoming vehicle is present within the lane line detection range derived based on the center line (step S701). When the oncoming vehicle is present within the lane line detection range, the processing proceeds to step S702. When the oncoming vehicle is present outside the lane line detection range, the processing proceeds to step S705.

Figure 8:
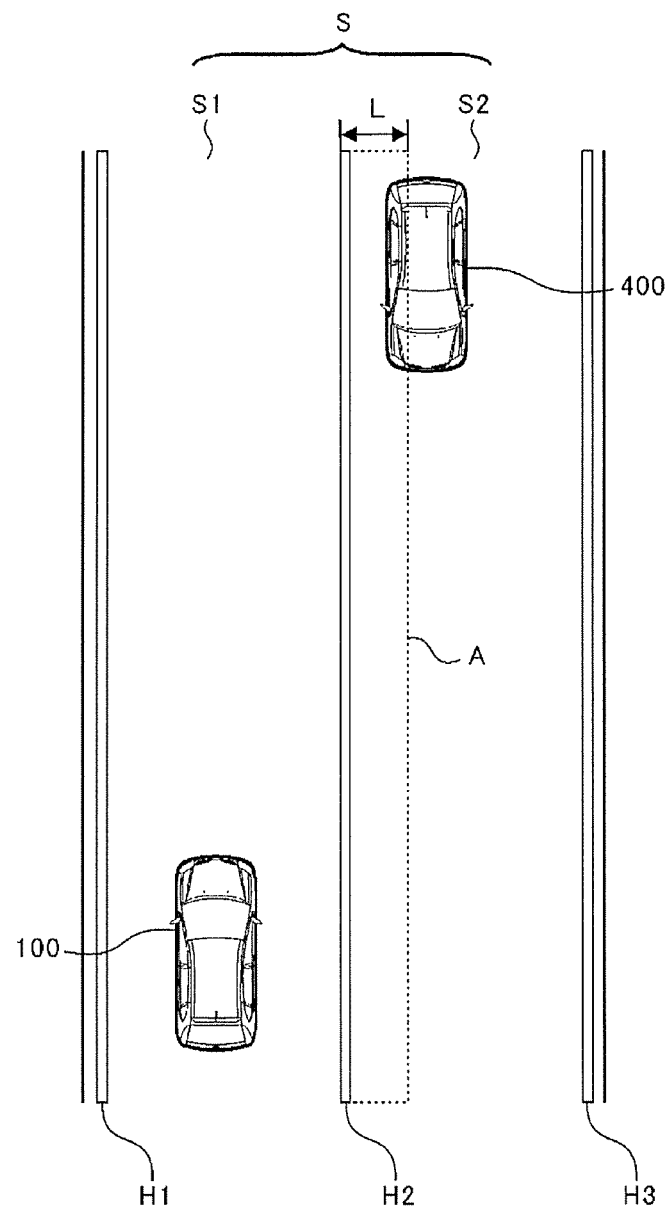
FIG. 8 illustrates a lane line detection range.

Next, the lane line detection range will be described. FIG. 8 illustrates a lane line detection range A. As illustrated in FIG. 8, the vehicle 100 travels in a travel lane S1 of a road S having one lane for each way and an oncoming vehicle 400 travels in an opposite lane S2 of the road S. The travel lane S1 is bordered by a lane line H1 (vehicle travel zone border line of the travel lane S1) and a lane line H2 (center line). The opposite lane S2 is bordered by a lane line H3 (vehicle travel zone border line of the opposite lane S2) and the lane line H2. The lane line detection range A is derived based on the lane line H2 (center line) and is, for instance, an area adjacent to the lane line H2 in the opposite lane S2 and within a predetermined distance L (for instance, within 1.4 m) from the lane line H2.

Returning to FIG. 7, when the oncoming vehicle is present within the lane line detection range A (YES in step S701), the control target oncoming vehicle selecting unit 222 determines whether a plurality of oncoming vehicles is present in the lane line detection range A (step S702). When a plurality of oncoming vehicles is present, the processing proceeds to step S703. When a plurality of oncoming vehicles is not present (that is, only one oncoming vehicle is present), the processing proceeds to step S704.

When a plurality of oncoming vehicles is present within the lane line detection range A (YES in step S702), the control target oncoming vehicle selecting unit 222 selects one control target oncoming vehicle from the plurality of oncoming vehicles (step S703). The reason why one control target oncoming vehicle is selected from the plurality of oncoming vehicles is that the control for specifically preventing collision between the vehicle 100 and an oncoming vehicle becomes uncertain unless the oncoming vehicle is identified accurately.

In step S703, the control target oncoming vehicle selecting unit 222 first obtains, from the predicted time deriving unit 218, the collision predicted times (TTC) that elapse before the plurality of oncoming vehicles collides with the vehicle 100. Then, the control target oncoming vehicle selecting unit 222 selects, from the plurality of oncoming vehicles, the oncoming vehicle having the shortest TTC as the control target oncoming vehicle for which collision with the vehicle 100 is avoided. The oncoming vehicle having the shortest TTC is considered to collide with the vehicle 100 earliest. Accordingly, the control target oncoming vehicle selecting unit 222 selects the oncoming vehicle having the shortest TTC as the control target oncoming vehicle.

When a plurality of oncoming vehicles having the same TTC is present, the control target oncoming vehicle selecting unit 222 obtains the first distances between the vehicle 100 and the oncoming vehicles in the travel direction of the vehicle 100 from the distance deriving unit 220. Then, the control target oncoming vehicle selecting unit 222 selects the oncoming vehicle having the shortest first distance from the plurality of oncoming vehicles having the same TTC as the control target oncoming vehicle. Of the plurality of oncoming vehicles present within the lane line detection range A, an oncoming vehicle having a longer distance from the vehicle 100 is considered to reduce its speed or change its travel path to avoid collision with an oncoming vehicle having a shorter distance from the vehicle 100. Accordingly, the control target oncoming vehicle selecting unit 222 selects the oncoming vehicle having the shortest first distance as the control target oncoming vehicle.

When a plurality of oncoming vehicles having the same TTC and the same first distance is present, the control target oncoming vehicle selecting unit 222 obtains the second distances between the vehicle 100 and the oncoming vehicles in the direction orthogonal to the travel direction of the vehicle 100, from the distance deriving unit 220. Then, the control target oncoming vehicle selecting unit 222 selects, from the plurality of oncoming vehicles having the same TTC and the same first distance, the oncoming vehicle having the shortest second distance as the control target oncoming vehicle. The plurality of oncoming vehicles having the same TTC and the same first distance travels in parallel and it is considered that the oncoming vehicle having the shortest second distance is likely to collide with the vehicle 100 among the oncoming vehicles traveling in parallel. Accordingly, the control target oncoming vehicle selecting unit 222 selects the oncoming vehicle having the shortest second distance as the control target oncoming vehicle.

When the control target oncoming vehicle selecting unit 222 selects one control target oncoming vehicle or only one oncoming vehicle is present within the lane line detection range A, the control target oncoming vehicle selecting unit 222 determines this oncoming vehicle to be the control target oncoming vehicle for which collision with the vehicle 100 is avoided (step S704).

In contrast, when no oncoming vehicles are present within the lane line detection range A (NO in step S701), the control target oncoming vehicle selecting unit 222 determines that there are no control target oncoming vehicles for which collision with the vehicle 100 is avoided (step S705).

Returning to FIG. 4, the control target oncoming vehicle selecting unit 222 determines whether one control target oncoming vehicle is present (step S409). When one control target oncoming vehicle is present, the processing proceeds to step S410. When no control target oncoming vehicles are present, the processing proceeds to step S411.

When one control target oncoming vehicle is present (YES in step S409), the control target oncoming vehicle selecting unit 222 determines that a control target oncoming vehicle is present and sets this oncoming vehicle as the control target oncoming vehicle (step S410).

In contrast, when steps S402, S403, S405, S406, S407, and S409 produce NO results, the control target oncoming vehicle selecting unit 222 determines that no control target oncoming vehicles are present and sets the absence of control target oncoming vehicles (step S411).

After that, when a control target oncoming vehicle is selected, the steering control unit 212 controls the steering mechanism 132 so as to avoid collision between the vehicle 100 and the control target oncoming vehicle. In addition, when a control target oncoming vehicle is selected, the braking control unit 210 controls the brake 160 so as to avoid collision between the vehicle 100 and the control target oncoming vehicle. This can control the vehicle 100 so as to avoid collision between the vehicle 100 with only the control target oncoming vehicle selected by the control target oncoming vehicle selecting unit 222 among the oncoming vehicles traveling in the opposite lane.

As described above, the erroneous detection determination unit 226 determines whether the oncoming vehicle detected by the oncoming vehicle detecting unit 216 has been erroneously detected based on the positional relationship between the position of the three-dimensional object detected by the three-dimensional object detecting unit 224 and the position of the oncoming vehicle detected by the oncoming vehicle detecting unit 216. Specifically, when the oncoming vehicle detected by the oncoming vehicle detecting unit 216 is present within the threshold range from the wall (center divider) detected by the three-dimensional object detecting unit 224, the erroneous detection determination unit 226 determines that the oncoming vehicle detected by the oncoming vehicle detecting unit 216 has been erroneously detected. This can reduce the erroneous execution of avoidance control for avoidance of collision between the oncoming vehicle detected erroneously and the vehicle 100. Accordingly, collision between the vehicle 100 and the oncoming vehicle can be avoided accurately.

In addition, the above vehicle control method of avoiding collision between a host vehicle and other oncoming vehicles, a program that causes a computer to function as the vehicle control device 140, a storage medium that stores the program, such as a computer-readable flexible disc, an optical magnetic disc, a ROM, a CD, a DVD, or a BD is also provided. Here, a program is a data processing member described in any language or any description method.

Although a preferred example of the present invention has been described with reference to the accompanying drawings, the present invention is not limited to such an example. Provided a person has ordinary knowledge in the technical field to which the example of the present invention pertains, within the scope of the technical idea described in the claims, the example of the present invention is intended to cover various modifications and applications, and such modifications and applications are intended to fall within the technical scope of the present invention.

The present invention can be used for a vehicle control device that makes control for avoiding collision between a host vehicle and an oncoming vehicle.

The invention claimed is:
1. A vehicle control device comprising:
circuitry configured to
   detect a three-dimensional object provided between a travel lane in which a host vehicle travels and an opposite lane in which an oncoming vehicle travels;
   detect a target object in the opposite lane; and
   determine that the detected target object is the oncoming vehicle traveling in the opposite lane based on:
   1) determining that (A) the detected target object is traveling at a speed equal to or more than a predetermined speed, (B) the detected target object has a size that is equal to or more than a predetermined size, (C) the detected target object has an aspect ratio that falls within a predetermined aspect ratio range, (D) the detected target object has a parallax density that falls within a predetermined parallax density range, and (E) the detected target object has an inclination that is equal to or less than a predetermined angle;
   2) determining that the detected target object is at least a threshold distance away from the three-dimensional object in a lateral direction, the lateral direction being a direction orthogonal to a traveling direction of the host vehicle; and
   3) determining that a distance between the host vehicle and the detected object in the traveling direction is equal to or less than a length of the detected center line,
   wherein when the detected target object is determined to be the oncoming vehicle traveling in the opposite lane, at least one of a steering mechanism and a braking control unit of the host vehicle is controlled to avoid collision between the host vehicle and the oncoming vehicle.

* * * * *